United States Patent [19]

Rosica et al.

[11] Patent Number: 5,512,226
[45] Date of Patent: * Apr. 30, 1996

[54] METHOD FOR MAKING A MOLDED APPLIQUE PRODUCT HAVING BACKLIGHTING CAPABILITY

[75] Inventors: George B. Rosica, Hockessin, Del.; Vance E. Smith, Caro, Mich.

[73] Assignee: Kaumagraph Flint Corporation, Millington, Mich.

[ * ] Notice: The portion of the term of this patent subsequent to Nov. 23, 2010, has been disclaimed.

[21] Appl. No.: 130,197

[22] Filed: Oct. 1, 1993

Related U.S. Application Data

[63] Continuation-in-part of Ser. No. 786,341, Nov. 8, 1991, Pat. No. 5,264,172.

[51] Int. Cl.⁶ .......................... B29C 45/16; B29C 45/14
[52] U.S. Cl. .......................... 264/132; 264/138; 264/154; 264/246; 264/247; 264/259; 264/328.6; 425/112; 425/127; 425/289
[58] Field of Search .................. 264/73, 74, 132, 264/255, 245, 246, 247, 328.18, 328.6, 328.8, 138, 153, 154, 155, 259, 269, 666; 425/112, 127, 129.1, 289

[56] References Cited

U.S. PATENT DOCUMENTS

| | | | |
|---|---|---|---|
| 2,485,323 | 10/1949 | Schwartz | 264/245 |
| 2,931,119 | 4/1960 | Gits et al. | 428/64 |
| 3,122,598 | 2/1964 | Berger | 264/247 |
| 3,270,101 | 8/1966 | Jardine et al. | 264/247 |
| 3,654,062 | 4/1972 | Loew | 264/246 |
| 4,307,058 | 12/1981 | Morello et al. | 264/132 |
| 4,315,724 | 2/1982 | Taoka et al. | 264/74 |
| 4,710,338 | 12/1987 | Bagnall et al. | 264/509 |
| 4,917,927 | 4/1990 | Sakaitani et al. | 428/40 |
| 4,931,248 | 6/1990 | Willemin | 264/132 |
| 5,081,208 | 1/1992 | Sjardijn | 526/166 |
| 5,152,861 | 10/1992 | Hann | 264/132 |
| 5,264,172 | 11/1993 | Rosica et al. | 264/132 |

FOREIGN PATENT DOCUMENTS

| | | |
|---|---|---|
| 148611 | 7/1985 | European Pat. Off. . |
| 565747 | 1/1981 | Japan . |
| 57-18229 | 1/1982 | Japan . |
| 57-25913 | 2/1982 | Japan . |
| 62-263013 | 11/1987 | Japan . |

OTHER PUBLICATIONS

Steven P. Ettore, "METTON® Liquid–Molding Resin—A Breakthrough in Structural Plastics", Hercules, Incorporated, no date.

Primary Examiner—Jay H. Woo
Assistant Examiner—Duane S. Smith
Attorney, Agent, or Firm—Joseph W. Molasky & Associates

[57] ABSTRACT

A method for making a molded applique product having backlighting capability is described. In this method, a three dimensional printed applique substrate is formed and then placed into a mold following which there is injected into the mold cavity behind the formed substrate olefin resins which are metathesized to form a molded and highly cross-linked polymeric product.

30 Claims, 6 Drawing Sheets

METHOD FOR MAKING A MOLDED APPLIQUE PRODUCT HAVING BACKLIGHTING CAPABILITY

This application is a continuation-in-part of application Ser. No. 07/786,341 filed Nov. 8, 1991, now U.S. Pat. No. 5,264,172.

BACKGROUND OF THE INVENTION

1. Field of the Invention

This invention relates to molded applique products of the type made of synthetic resins having printing on a surface thereof and to a method of making the same. Products of this type are used, by way of example, to make automobile instrument panels.

2. Description of the Prior Art

Products of the indicated type have been made for many years by a method known in the art as an in-mold decorating process. This process, which has been in use since at least as early as 1972, was used to produce printed parts on polystyrene and polypropylene sheets that were, after printing, die cut and sent to injection molders to be in-molded into a finished product. By way of example, some of these products were plastic lunch boxes, pitchers, and canisters. In this process, the overlays or in-mold decoratives were produced by offset printing and/or screen printing, and the parts were flat and were held into the mold with a static charge. Because the overlays or in-mold decoratives did not contain complete (100 percent) ink coverage, it was possible to print on the rear surface of these parts and still have the molten plastic material fused to the rear surface of the plastic substrate, thus leaving a layer of plastic film on the outside to protect the graphics. In this process, the gating of the mold had to be such that the introduction of the plastic took place where there was no ink, since any ink present in this area would tend to move or distort. The bonding in this case would only take place between the clear plastic area of the overlay and the molding compound itself.

A molding method essentially the same as the in-mold decorating process described above is disclosed in U.S. Pat. No. 4,917,927. The patent claims novelty in the printing step wherein a synthetic resin sheet has an ink film applied to at least one side of the resin sheet wherein the ink film comprises one or more layers, each of which has a specific minimum thickness. The patent states that by this inking process that it is possible to produce a backlighting product. Backlighting products are well known in the art and are capable of making a pictorial image printed thereon look bright when viewed from the front if light is shown from the rear of the product. Products of this type are used to make automobile instrument panels. The patent discloses the printing on a flat resin sheet which is placed into a die into which a molten synthetic resin is injected pursuant to the in-mold technique discussed above.

The prior art techniques were not suitable for making a three-dimensional applique product of the type shown in the drawings. In fact, those skilled in the art believed it would not be possible to obtain the shape and configuration of this type while at the same time providing an acceptable decorative presentation. It was believed that during the in-mold process of the prior art the product would be deformed and thereby harm the decorative presentation. However, the development of monomer resins which can be polymerized in situ as an alternative to molten thermoplastic injection molding has overcome many of the problems associated with the injecting of molten plastic onto a printed substrate. One such development is the "METTON®" liquid-molding resin. METTON® is a registered trademark of Hercules, Inc. (Hercules Plaza, Wilmington, Del. 19894-0001) for a proprietary blend of polydicyclopentadiene (PDCPD) formed by the metathesis polymerization of dicyclopentadiene (DCPD). The METTON® liquid molding resin involves the mixing of an "A" DCPD component with a "B" DCPD component within a mold cavity. The A and B DCPD components polymerize in situ to create polydicyclopentadiene at a reaction temperature of about 170° C. to about 200° C. METTON® resins have the advantage that less energy is required in the liquid molding of plastic parts than is needed for the thermoplastic injection molding thereof. Also, the polymerization reaction temperature of PDCPD is lower than the melt temperature of thermoplastic polymers whereby thinner substrates and inks, which are less temperature deformable, can be utilized in the production of back-lit products.

SUMMARY OF THE INVENTION

It is a general object of this invention to provide a method of making applique products derived from synthetic resins. These products are obtained by an in situ polymerization molding process to produce a three-dimensional product having protruding portions, concave portions, or the like onto which indicia may be imprinted.

This general object is achieved by the following method:

(1) providing a flat substrate made of a clear synthetic resin;

(2) printing on the front surface of said substrate using a formable ink;

(3) pre-cutting the printed substrate to establish registration holes for a forming tool, this cutting step being performed, for example, by die cutting in a shearing machine;

(4) forming the printed substrate into a three dimensional shape, preferably by a cold-forming process to thereby reduce the internal stress from the internal form;

(5) providing a mold having a first surface of the same configuration as said formed substrate;

(6) die cutting the formed substrate so that it fits to the molding surface with minimal interference and such that the part can be placed in the die by reason of its configuration; and (7) placing the formed substrate into the mold against said first mold surface and injecting a two-part clear dicyclopentadiene (DCPD) resin into the mold cavity space located behind the formed substrate, said molding step being achieved by simultaneously introducing the two combined solutions of liquid DCPD directly behind the formed substrate through a plurality of gates, and polymerizing said DCPD solutions in situ within the mold cavity space.

The above process produces a one-piece, permanently bonded applique product having the three-dimensional shaped configuration of the formed substrate.

There are some important parameters involved in the above-described method. Thus, the thickness of the substrate material must be thick enough so as to isolate the inks from the heat of reaction of the polymerizing DCPD solutions in the specific method described. Also, the ink used in the process is a formable, high temperature ink that can withstand the stresses of the form as well as the heat from the polymerization of the two DCPD solutions during the in-molding process. Furthermore, the molding tools face (area where the front of the applique rests on the tool) should be maintained at a temperature of about 20°–44° C. Further, the rear portion of the molding tool (area which forms the mold cavity space behind the substrate) should be maintained at about 60° C. and should have means to prevent DCPD polymerization over the area to be backlit in the finished product since PDCPD is not a clear polymer. Additionally, the two DCPD solutions should be maintained at a temperature of about 30°–35° C. immediately prior to injection into the mold.

Also, a feature of the above-described method in accordance with the invention is that the two DCPD solutions are injected through gates directly onto, and perpendicular to the surface of the applique.

An important advantage of the above-described method of the invention is that it is capable of producing a three dimensional shaped product. Further, the use of cold-forming and the subsequent liquid polymerization molding process makes it possible to produce a product with a reduced amount of internal stress. The prior art methods cannot achieve this result. Further, the prior art, such as U.S. Pat. No. 4,917,927, has not considered it possible to inject directly onto the printed applique substrate because of concern that a molten resin, with its high temperature and heat, will destroy the applique. However, with the method in accordance with the invention since the liquid molding resin reaction temperature is lower than conventional thermoplastic resin molten temperatures, it is possible to reduce the process heat and pressures and still inject the liquid resin directly onto, and perpendicular to the surface of the applique. The advantage of injecting a two part monomer resin directly is that it is not necessary to force a molten polymer resin into areas by increasing the pressure. The novel gating arrangement and in situ polymerization also makes it possible to design the mold with greater ease in that there is no restriction that the gates be located so as to prevent a molten material from impinging upon the applique surface in a fashion that would disrupt the applique. Also, by pre-forming the printed applique substrate and providing a molding tool as described above, there is no need to use the molding pressures to create a product having a three-dimensional configuration. Finally, by utilizing an in-situ polymerization, energy costs associated with melting a thermoplastic resin as in prior art techniques are reduced.

Another object of the invention is to provide a novel molded applique product by an in- situ polymerization molding method of the above indicated type. Briefly stated, the novel product comprises a three-dimensional composite product having integral discrete printed symbols illuminatable when the product is back lit. The product is comprised of a synthetic resin substrate having a complex three-dimensional and non-regular geometric shape defining at least one opening, at least one ink layer printed on at least one surface of said substrate, said ink layer including multi-colored inks providing discrete symbols, and a synthetic resin layer fused with said pre-formed substrate. The resin layer back surface has integral protruding portions, and the resin layer defines at least one opening which corresponds to the opening of said substrate. The inks and the resin layer are arranged such that said discrete symbols printed on said substrate are illuminated when light is applied to the back surface of said resin layer.

DETAILED DESCRIPTION OF THE PREFERRED EMBODIMENT

An initial step in accordance with a preferred embodiment of the method of the invention is to provide a flat substrate of a synthetic resin such as polycarbonate. The substrate is indicated generally at 10 in FIG. 3.

Figure 3:
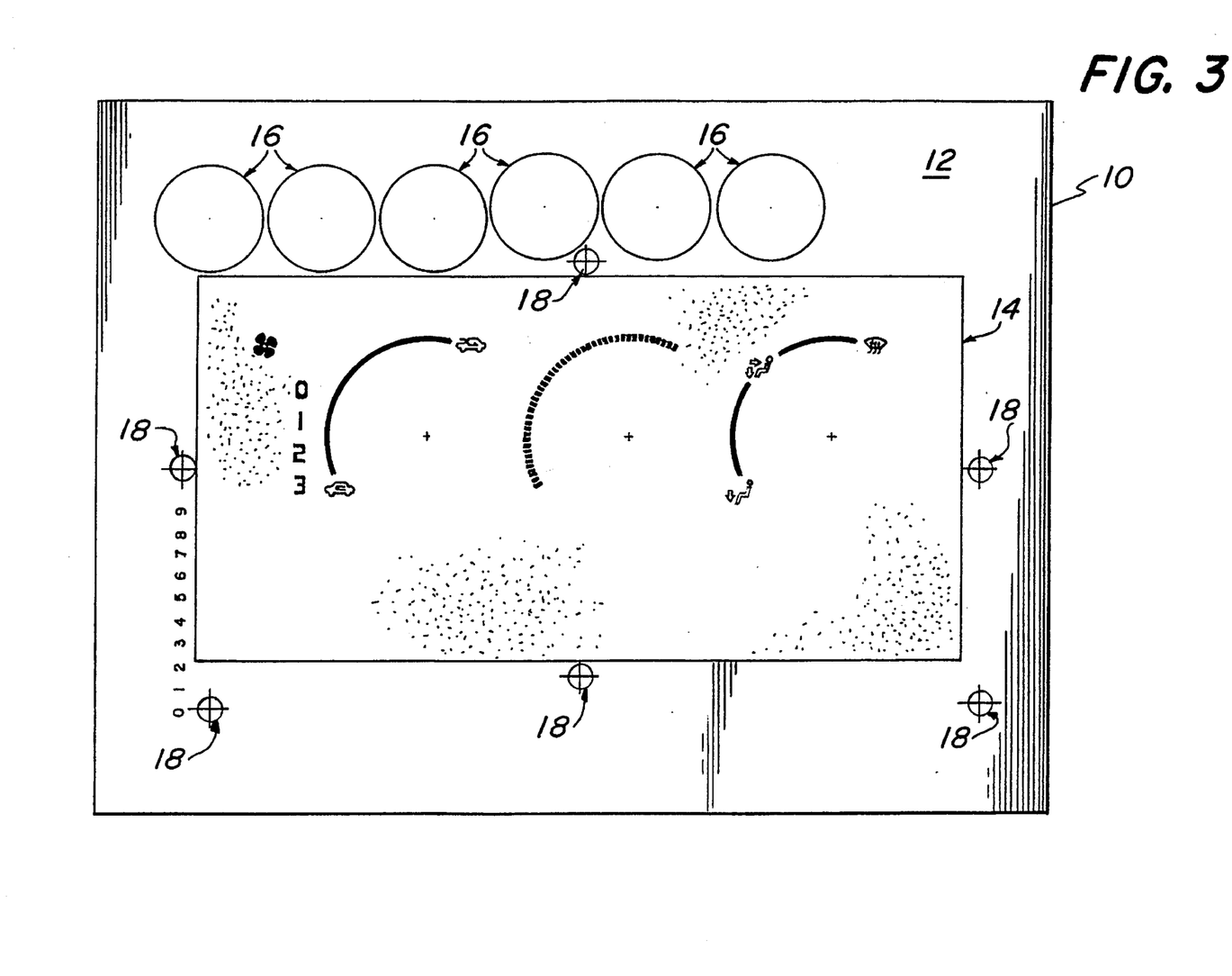
FIG. 3 is a plan view of a printed substrate pursuant to the method in accordance with the invention.

The next step in the method is to print the desired design on the front surface 12 of substrate 10 using formable ink. Suitable inks that can be used are solvent based polyester inks that adhere to synthetic resins such as polycarbonate. As shown in FIG. 3, a printed design indicated generally at 14 is provided in a rectangular configuration. The printing step is performed by the making of a plurality of printing passes wherein a single color is applied during the running of each path. The different colors are also applied in the circular areas shown in FIG. 3 located above the printed design 14, which areas 16 form no part of the completed product as will be described hereafter. Also, a plurality of marks 18 for registration holes are printed at locations located around the printed design 14 as is apparent in FIG. 3.

The next step is the shearing step wherein the printed substrate 10 is precut into rectangles and has a plurality of registration holes (at marks 18) punched therein. This step produces a printed part that is prepared to be used in a forming tool whereby it is shaped to fit within the tool and to register with the registration pins of said tool. This step is preferably performed in a shearing machine.

Figure 4:
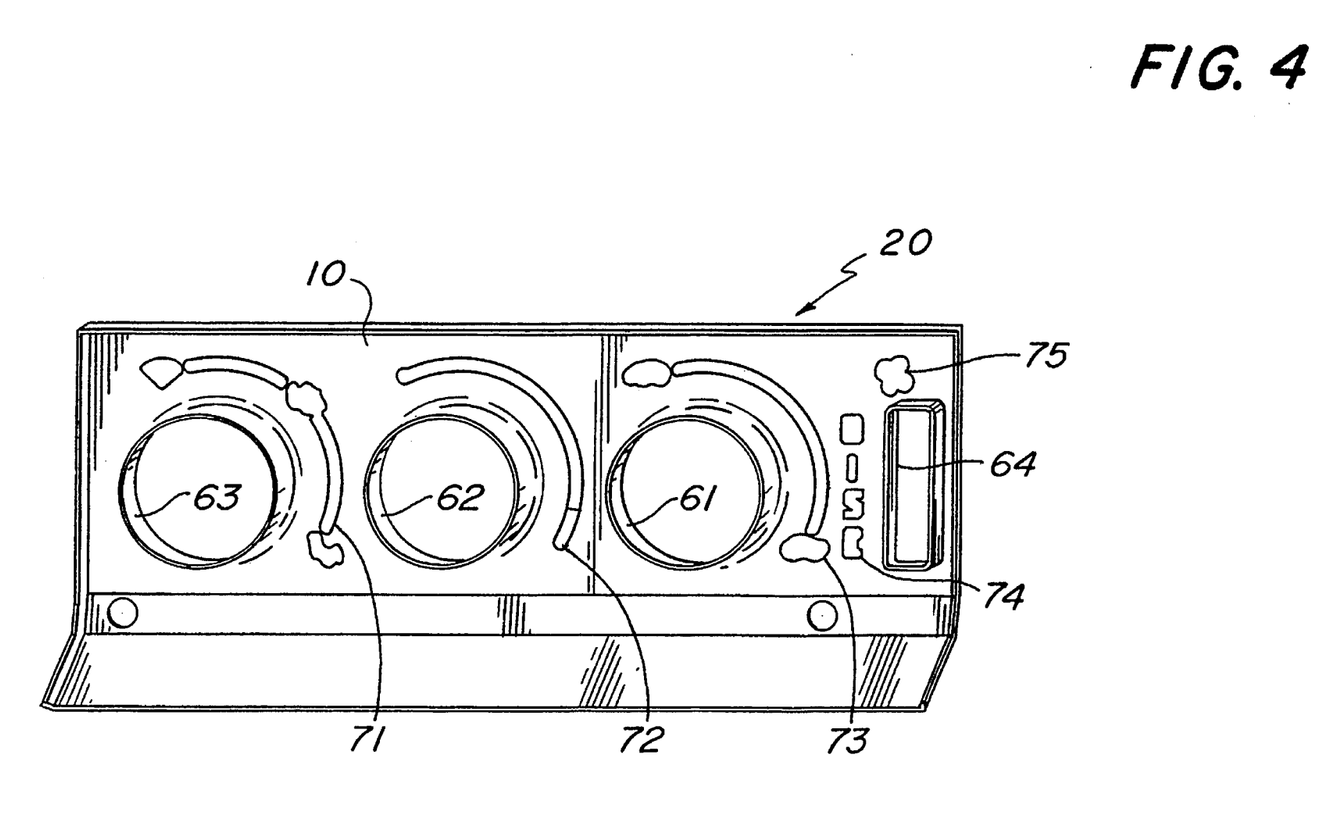
FIG. 4 is a perspective view of a formed substrate pursuant to the method of the invention.

The next step is the forming step wherein the precut printed substrate is formed into a three-dimensional shape, such as the formed substrate 20 illustrated in FIG. 4. The forming step is preferably performed by a cold forming process to thereby reduce the internal stress from the internal form. In this step, the flat sheet is placed into a forming press which is run through its forming cycle to form the sheet into the three-dimensional shape desired, which shape can have, as illustrated in FIG. 4, a non-regular geometric shape defining openings and comprising a bent configuration including a pair of obtuse angles and protruding portions or concave portions.

The next step is to cut the formed substrate 20 into a configuration such that it fits into the die used in the molding step to be performed hereafter in a manner that the configuration of the formed substrate 20 serves to hold it in place. Thus, the formed substrate 20 must be cut so that it fits into the molding tool with a minimal interference fit.

Figure 5:
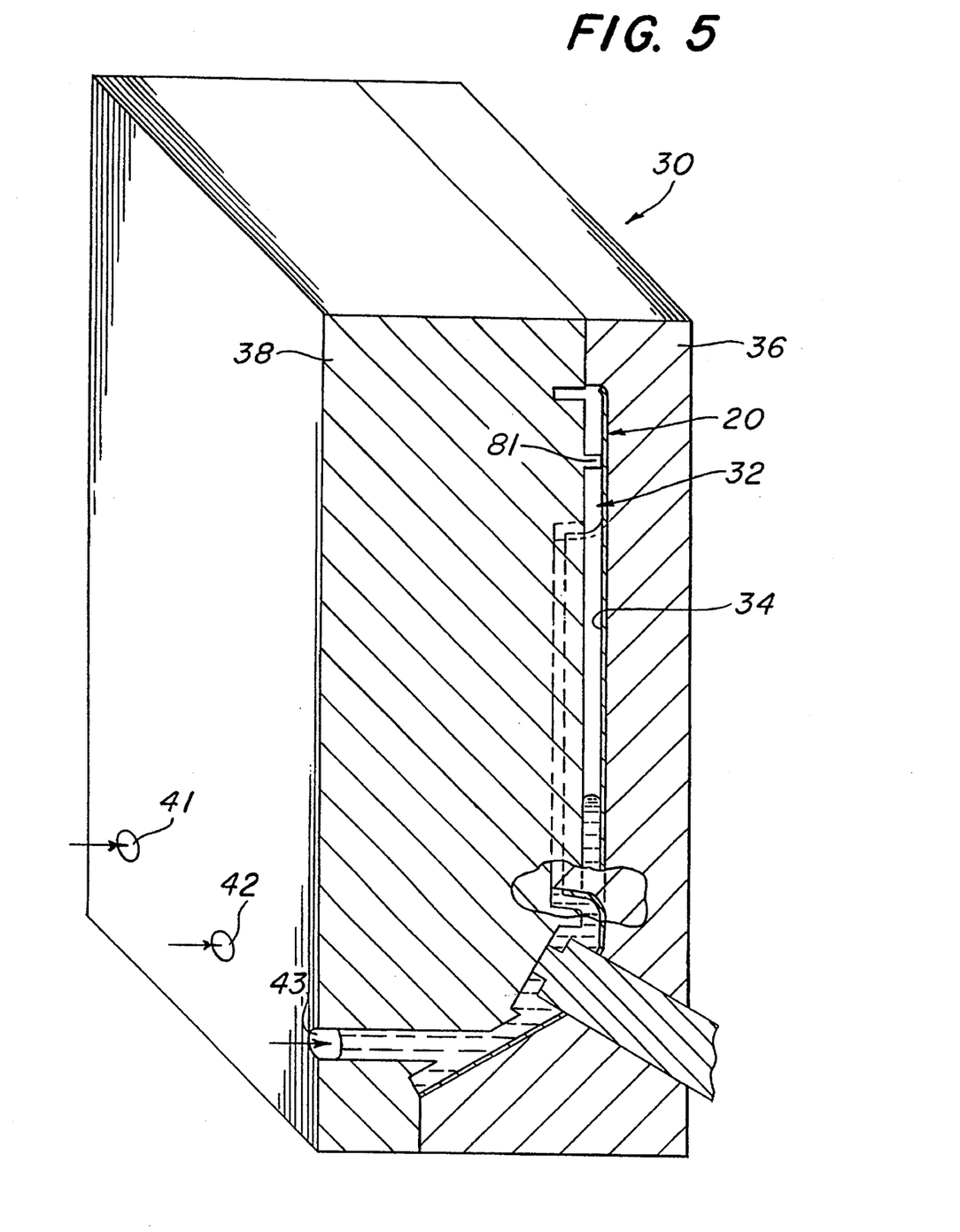
FIG. 5 is a perspective view illustrating the molding step pursuant to the method in accordance with the invention.

In FIG. 5, there is shown a molding tool 30 for use in the method in accordance with the invention. The molding tool 30 provides a cavity 32 which includes a first surface 34 that has the same configuration as that of the formed substrate 20. The molding tool 30 is formed of a front half 36 and a back half 38 which are secured together to define the mold cavity 32 therebetween. The back mold half 38 is provided with three gates 41, 42, and 43 through which the combined liquid monomer solutions are introduced into the bottom of the cavity 32. The three gates 41, 42, and 43 extend in a direction perpendicular to the mold cavity 32.

Figure 6:
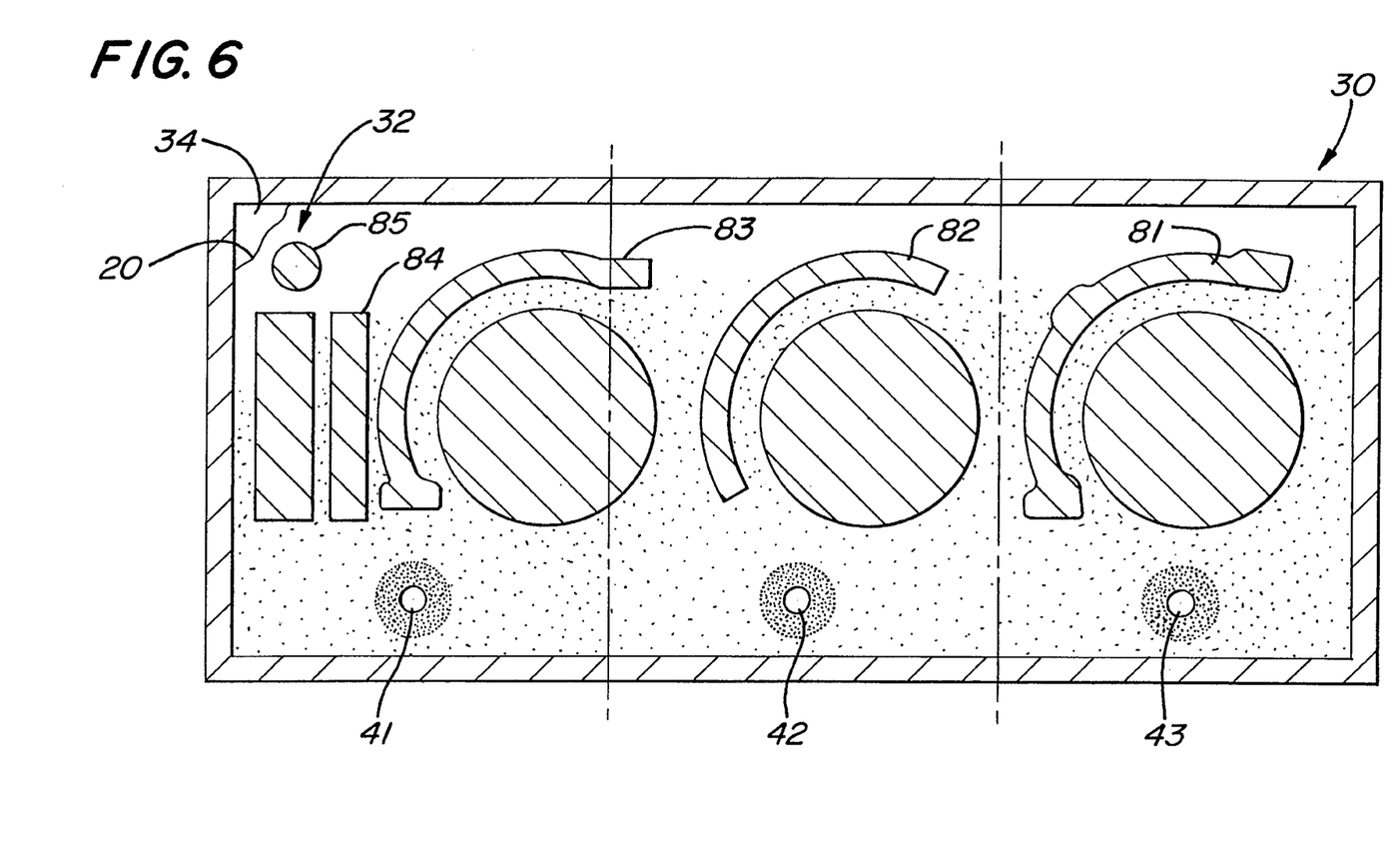
FIG. 6 is a diagrammatic view of the molding step shown in FIG. 5.

The next step in the method is the insert molding step wherein the formed substrate 20 is placed into the cavity 32 of the molding tool 30 against the front mold surface 34 and the mold is closed to hold substrate 20 in a position as illustrated in FIG. 5. A 1:1 ratio of METTON® "A" DCPD and METTON® "B" DCPD solutions are then simultaneously injected into the bottom of cavity 32 directly behind the formed substrate through the three gates 41, 42, and 43. FIG. 6 illustrates the flow of the combined monomer solutions upwardly within cavity 32. An important aspect of the molding step is shown in FIGS. 4 and 6. PDCPD is not transparent. Therefore, it is important that the polymerization is prevented behind the areas of the substrate 20 which are to be backlit in the finished product such as 71, 72, 73, 74, and 75 shown in FIG. 4. To prevent polymerization over these areas, the back half 38 of mold 30 has projections which extend from the back half 38 of mold 30 to the back portion of the formed substrate 20 to cover areas 71–75 during the polymerization step. These projections are shown in FIG. 6 as mold projections 81, 82, 83, 84, and 85 which cover areas 71, 72, 73, 74, and 75, respectively, on substrate 20 during polymerization in the mold 30. Projections 81–85 prevent polymerization over areas 71–75, respectively, thereby leaving gaps in the opaque PDCPD and thereby allowing areas 71–75 to be backlit when light is applied to the back side of the finished product. During the molding step the front half 36 of molding tool 30 should be maintained at a temperature of about 20°–44° C. The back half 38 of mold tool 30 should be maintained at a temperature of about 60°–80° C. and the "A" DCPD and the "B" DCPD solutions should be maintained at a temperature of about 30°–35° C. immediately prior to injection into mold cavity 32. The polymerization reaction temperature is about 170°–200° C. and the polymerization reaction rate is about 1.5 kg/sec.

Figure 1:
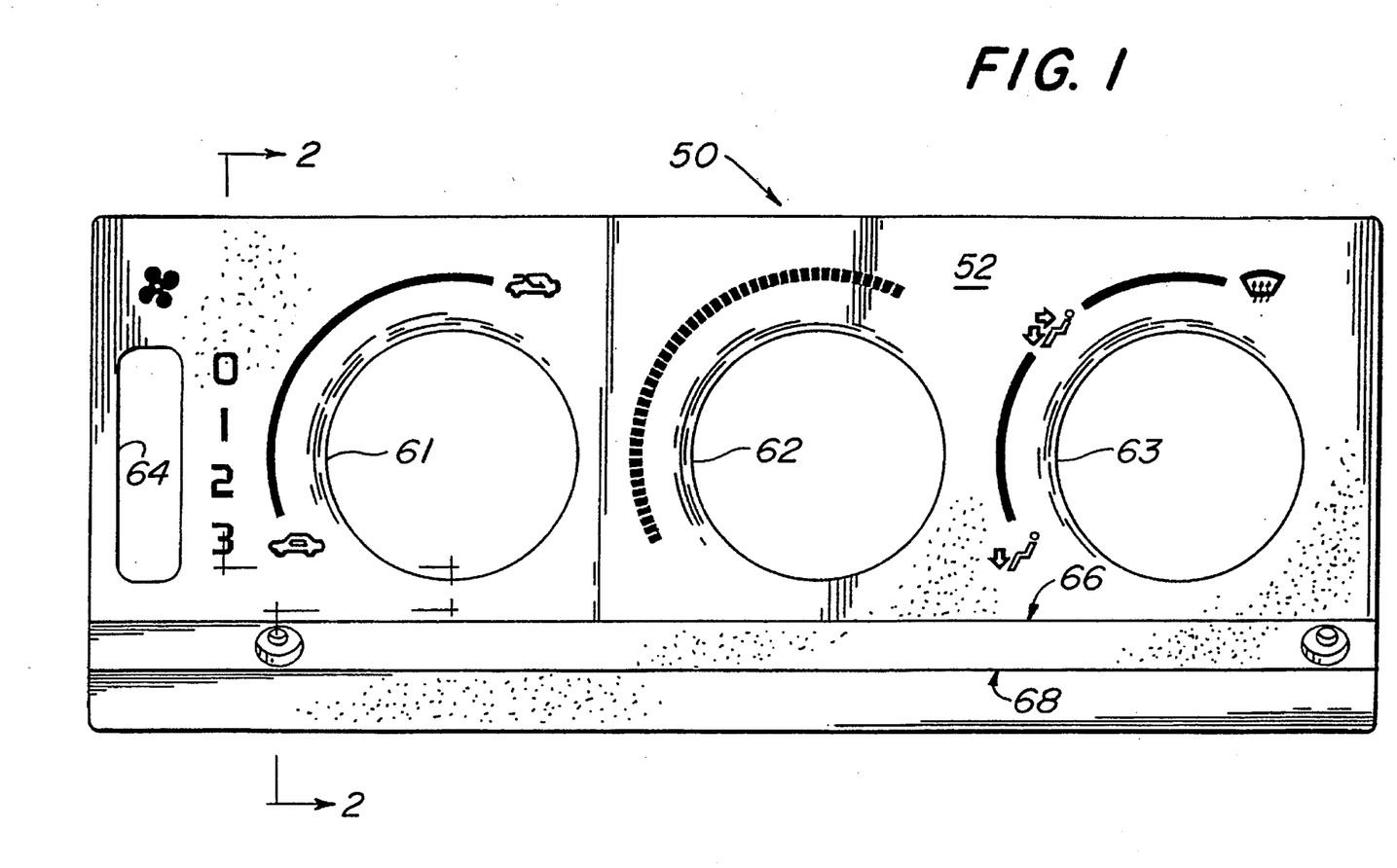
FIG. 1 is a front elevational view of a molded applique product made by the method in accordance with the invention.
Figures 2, 2A:
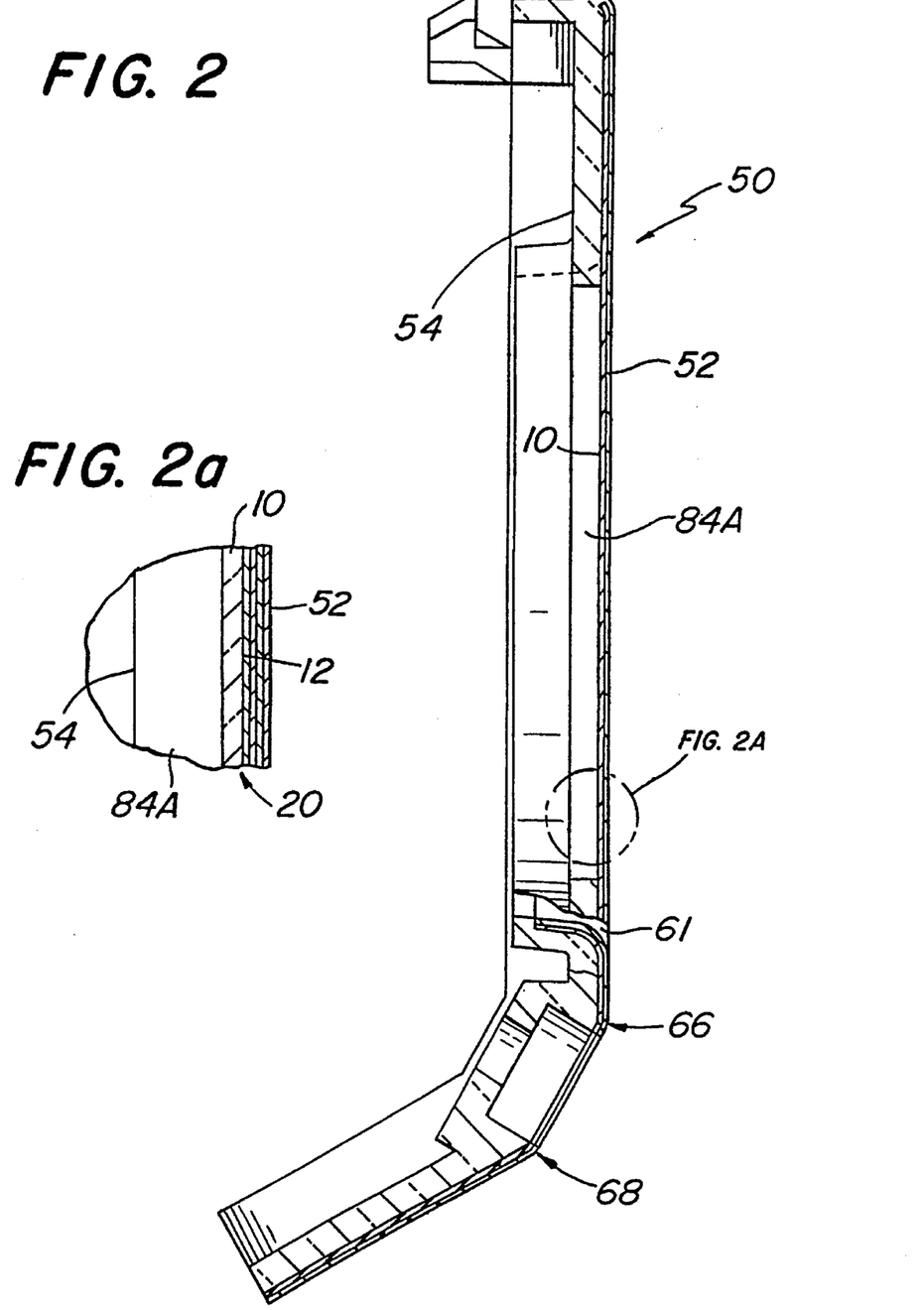
FIG. 2 is a section taken on line 2—2 of FIG. 1.
FIG. 2a is an enlarged detailed view of the circles portion shown in FIG. 2.

The above-described method produces a one-piece permanently bonded applique product having the three-dimensional shaped configuration of the formed substrate 20 as is apparent from FIGS. 1 and 2 which illustrates the molded applique product 50. Thus, the product 50 comprises a front wall comprising formed synthetic resin substrate 20, which includes a plurality of printed layers 52 which are applied to the front face 12 of the substrate 20, and a back wall comprising the PDCPD 54 having gaps in the PDCPD 54 over areas of the printed layers 52 which are to be backlit such as gap 84A shown in FIGS. 2 and 2A provided by mold projection 84 during the molding step.

Referring to FIGS. 1 and 2, wherein a novel product in accordance with the invention is disclosed in detail, it will be noted that there is provided a three-dimensional composite product 50 having integral discrete symbols illuminatable when the product is back lit. The synthetic resin substrate 20 has a complex three-dimensional and non-regular geometric shape defining three circular openings 61, 62, 63, and a generally rectangular-shaped opening 64. As discussed above, the substrate 20 is pre-formed and has a front surface and a back surface as best illustrated in FIG. 2A.

The substrate has at least one ink layer printed on at least one surface thereof. More particularly, the ink layer includes multi-colored inks providing discrete symbols as is shown in FIGS. 1, 2, and 2a.

The product 50 also comprises a synthetic resin layer 54 fused with the pre-formed substrate 20 which layer 54 has a front surface and a back surface. The front surface of synthetic resin layer 54 mates with the back surface of substrate 20. The back surface of synthetic resin layer 54 has integral protruding portions as shown in FIG. 2. Also, the synthetic resin layer 54 defines four openings which correspond to the four openings 61–64, respectively, in the substrate 20.

It will be noted that the inks and the resin layer 54 are arranged such that discrete symbols printed on the substrate 20 are illuminated when light is applied to the back surface of the resin layer 54 as is apparent from a consideration of FIGS. 1, 2, and 2a and from the discussion above of the gaps in the resin layer 54 over areas to be backlit.

As is illustrated in FIGS. 1 and 2, the openings 61–63 in the pre-formed substrate 20 are formed by a rounded portion of the substrate 20 projecting rearwardly from said front surface thereof. The rounded portion of the substrate 20 forming opening 61 includes a rearwardly extending portion and a curved portion forming a rounded edge with the rearwardly extending portion being joined with said curved portion to form the opening 61. Openings 62 and 63 have the same construction as opening 61.

It will also be apparent from a consideration of FIGS. 1 and 2 that the product 50 is shaped to provide two obtuse angles, indicated generally at 66 and 68 as is best shown in FIG. 2.

A specific example pursuant to the invention is set forth below:

EXAMPLE

The parts were printed, seven-up, on a 22 inch by 31 inch, 0.020 inch thick polycarbonate sheet, all printing being a front surface operation. Below is a list of the passes and the specifications for running these passes:

| | PASS | INK | DRY TIME | SCREEN | EMULSION | BLADE |
|---|---|---|---|---|---|---|
| 1. | Pinhole | 40070306 Mylar | 3.5 hrs. | 270 Wire | Direct | 85 D. Sharp |
| 2. | Green | 40070271 Mylar | 3.0 hrs. | 270 Wire | Direct | 85 D. Sharp |
| 3. | White | 40070307 Mylar | 3.0 hrs. | 270 Wire | Direct | 85 D. Sharp |
| 4. | Yellow | 40070313 Mylar | 3.5 hrs. | 270 Wire | Direct | 85 D. Sharp |
| 5. | Red | 40070314 Mylar | 3.5 hrs. | 270 Wire | Direct | 85 D. Sharp |
| 6. | Blue | 40070317 Mylar | 3.5 hrs. | 270 Wire | Direct | 85 D. Sharp |
| 7. | Graphics | 40070306 Mylar | 3.5 hrs. | 270 Wire | Indirect/ Direct | 85 D. Sharp |

The inks selected were all solvent based polyester inks adherable to polycarbonate and of a type that can withstand the stresses of the forming steps as well as the temperature of the resin injection step described hereinafter.

During the printing process, the parts are coated to provide for scratch and solvent resistance.

After printing, the parts were sheared into rectangles for use in a one cavity forming tool. Registration holes were punched in the parts at this time also, whereby the parts were ready for the forming press.

The forming step was performed in a one cavity tool. Each part was placed on the tool's registration pins by inserting the pins within the registration holes previously punched therein and the part was then formed. The forming procedure involved the following steps:

1. The tool was placed on the shuttle table that enters the press.
2. A "slow-close" technique was used to set the machine to the configuration of the tool.
3. Pressures were then set to 4,000 pounds.
4. Parts were then placed on the tool using the registration pins established.
5. The parts were then run through the forming cycle two times and then removed.

In the next step, i.e., the cutting step, the parts were laser cut to a desired size so as to fit properly in the molding tool.

After cutting, the parts were placed by hand into the molding tool, with the configuration of the form serving to hold the part in place. Caution was taken that the part sits flush with the forming tool. The head of the tool whereat the applique sits was heated and maintained at 60° C. to 80° C. using heating lines and the two DCPD monomer solutions were maintained at 30°–35° C. prior to injection. The two monomer solutions were then simultaneously injected into the mold cavity behind the printed part.

The part was then removed from the die and masked in the back thereof at all locations with the exception of the graphic areas. This reduced the possibility of pin holes.

Each part was then examined for suitability for shipment.

While the preferred embodiment has been fully described and depicted for the purposes of explaining the principles of the present invention, it will be appreciated by those skilled in the art that modifications, substantiations, and changes may be made thereto without departing from the scope of the invention set forth in the appended claims.

We claim:

1. A method of making an applique product derived from synthetic resins by an in-situ polymerization molding process so as to produce a three dimensional product, said method comprising the steps of:

(1) providing a flat substrate having a front surface and a back surface, said substrate being made of a synthetic resin,
   (2) printing on a surface of said substrate,
   (3) cutting the printed substrate for fitting within a forming tool,
   (4) forming the printed substrate into a three dimensional shape to produce a formed substrate having low internal stress,
   (5) providing a mold having a mold cavity in which a mold surface has the same configuration as the front surface of said formed substrate, said mold having a front half and a back half,
   (6) conforming said formed substrate to fit securely into said mold cavity,
   (7) placing the formed substrate into said mold cavity in such a manner that the front surface of said formed substrate is in contact with said mold surface whereupon the mold is then closed for conducting the molding operation,
   (8) simultaneously injecting two flowable monomer resin solutions into the cavity located adjacent said back surface of said formed substrate through a gate means, said resin being constituted so as to polymerize in situ and fuse with said back surface.

2. A method of making applique products according to claim 1 wherein the forming of the printed substrate of step (4) is performed by a cold forming process that results in low internal stress in the formed substrate.

3. A method of making applique products according to claim 1 wherein the two injected resin solutions of step (8) are dicyclopentadiene resin solutions.

4. A method of making applique products according to claim 3 wherein the inks in the printing step (2) are formable inks capable of withstanding the stresses of the forming step (4) as well as the polymerization reaction temperatures of step (8) without deforming.

5. A method of making applique products according to claim 1 wherein a plurality of inks of multiple colors are used in the printing step (2).

6. A method of making applique products according to claim 1 wherein said formed substrate is dimensioned to achieve a minimal interference fit when placed in the cavity of the mold with said front surface in contact with the mold surface in step (7) so that said formed substrate will not move during the injection of resin according to step (8).

7. A method of making applique products according to claim 1 wherein the injecting of two flowable monomer resin solutions into the cavity space according to step (8) is achieved by the use of said gate means wherein a plurality of gates are located so that the two resin solutions flow directly onto the formed substrate in a direction perpendicular thereto.

8. A method of making applique products according to claim 1 wherein in step (8) said front half of said mold is maintained at a temperature between 20° C. and 44° C., and said back of said mold is maintained at a temperature between 60° C. and 80° C. so that damage of said inks does not occur, said resin solution temperature being maintained between 30° C. and 35° C. immediately prior to injection into said mold cavity.

9. A method of making applique products according to claim 1 wherein said substrate is made of a clear polycarbonate.

10. A method of making an applique product derived from synthetic resins by an in-situ polymerization molding process so as to produce a three dimensional product, said method comprising the steps of:

(1) providing a flat substrate having a front surface and a back surface, said substrate being made of a synthetic resin,
   (2) printing on a surface of said substrate,
   (3) shearing the print substrate for use in a forming tool and punching said printed substrate to form a plurality of registration holes to register with a plurality of registration pins of a forming tool,
   (4) forming the printed substrate into a three dimensional shape to produce a formed substrate having low internal stress,
   (5) providing a mold having a mold cavity in which a mold surface has the same configuration as the front surface of said formed substrate, said mold having a front half and a back half, (6) conforming said formed substrate to fit securely into said mold cavity, (7) placing the formed substrate into said mold cavity in such a manner that the front surface of said formed substrate is in contact with said mold surface whereupon the mold is then closed for conducting the molding operation, (8) simultaneously injecting two flowable monomer resin solutions into the cavity located adjacent said back surface of said formed substrate through a gate means, said resin being constituted so as to polymerize in situ and fuse with said back surface.

11. A method of making applique products according to claim 10 wherein the forming of the printed substrate of step (4) is performed by a cold forming process that results in low internal stress in the formed substrate.

12. A method of making applique products according to claim 10 wherein the two injected resin solutions of step (8) are dicyclopentadiene resin solutions.

13. A method of making applique products according to claim 12 wherein the inks in the printing step (2) are formable inks capable of withstanding the stresses of the forming step (4) as well as the polymerization reaction temperatures of step (8) without deforming.

14. A method of making applique products according to claim 10 wherein a plurality of inks of multiple colors are used in the printing step (2).

15. A method of making applique products according to claim 10 wherein said formed substrate is dimensioned to achieve a minimal interference fit when placed in the cavity of the mold with said front surface of said formed substrate in contact with the mold surface in step (7) so that said formed substrate will not move during the injection of resin according to step (8).

16. A method of making applique products according to claim 10 wherein the injecting of two flowable monomer resin solutions into the cavity space according to step (8) is achieved by the use of said gate means wherein a plurality of gates are located so that the two resin solutions flow directly onto the formed substrate in a direction perpendicular thereto.

17. A method of making applique products according to claim 10 wherein said front half of said mold is maintained at a temperature between 20° C. and 44° C., and said back of said mold is maintained at a temperature between 60° C. and 80° C. so that damage of said inks does not occur, said resin solution temperature being maintained between 30° C. and 35° C. immediately prior to injection into said mold cavity.

18. A method of making applique products according to claim 10 wherein said substrate is made of a clear polycarbonate.

19. A method of making an applique product derived from synthetic resins by an in-situ polymerization molding process so as to produce a three dimensional product, said method comprising the steps of:

(1) providing a flat substrate having a front surface and a back surface, said substrate being made of a synthetic resin, (2) printing on a surface of said substrate, (3) shearing the printed substrate for fitting within a forming tool, (4) forming the printed substrate into a three dimensional shape to produce a formed substrate having low internal stress, (5) providing a mold having a mold cavity in which a mold surface has the same configuration as the front surface of said formed substrate, said mold having a front half and a back half, (6) conforming said formed substrate to fit securely into said mold cavity, (7) placing the formed substrate into said mold cavity in such a manner that the front surface of said formed substrate is in contact with said mold surface whereupon the mold is then closed for conducting the molding operation, (8) simultaneously injecting two flowable monomer resin solutions into the cavity located adjacent said back surface of said formed substrate through a gate means, said resin being constituted so as to polymerize in situ and fuse with said back surface, said mold having projections extending from said back half to contact the back surface of the substrate to cover areas which are to be back lit thereby preventing polymerization over the areas.

20. A method of making applique products according to claim 19 wherein the forming of the printed substrate of step (4) is performed by a cold forming process that results in low internal stress in the formed substrate.

21. A method of making applique products according to claim 19 wherein the two injected resin solutions of step (8) are dicyclopentadiene resin solutions.

22. A method of making applique products according to claim 21 wherein the inks in the printing step (2) are formable inks capable of withstanding the stresses of the forming step (4) as well as the polymerization reaction temperatures of step (8) without deforming.

23. A method of making applique products according to claim 19 wherein a plurality of inks of multiple colors are used in the printing step (2).

24. A method of making applique products according to claim 19 wherein said formed substrate is dimensioned to achieve a minimal interference fit when placed in the cavity of the mold with said formed substrate front surface in contact with the mold surface in step (7) so that said formed substrate will not move during the injection of resin according to step (8).

25. A method of making applique products according to claim 19 wherein the injecting of two flowable monomer resin solutions into the cavity space according to step (8) is achieved by the use of said gate means wherein a plurality of gates are located so that the two resin solutions flow directly onto the formed substrate in a direction perpendicular thereto.

26. A method of making applique products according to claim 19 wherein said front half of said mold is maintained at a temperature between 20° C. and 44° C., and said back of said mold is maintained at a temperature between 60° C. and 80° C. so that damage of said inks does not occur, said resin solution temperature being maintained between 30° C. and 35° C. immediately prior to injection into said mold cavity.

27. A method of making applique products according to claim 19 wherein said substrate is made of a clear polycarbonate.

28. A method of making applique products derived from synthetic resins by an in-situ polymerization molding process so as to produce a three dimensional product, said method comprising the steps of:

(1) providing a flat substrate having a minimum of 0.020 inches thickness, said substrate being made of a synthetic resin, (2) printing on a surface of said substrate using a formable ink, (3) cutting the printed substrate for fitting within a forming tool, (4) forming the printed substrate into a three dimensional shape to produce a formed substrate having a front surface and a back surface and a low internal stress, (5) providing a mold cavity including a mold surface of the same configuration as the front surface of said formed substrate, (6) conforming the formed substrate to have dimensions such that said formed substrate fits into the mold cavity in a secure position with said front surface of said formed substrate in contact with said mold surface, (7) placing the formed substrate into the cavity of the mold in a secure position with said front surface of said formed substrate in contact with said mold surface and closing the mold in preparation for a molding operation, and, after the completion of steps (1) to (7), (8) simultaneously injecting two flowable resin solutions into the cavity located adjacent said back surface of said formed substrate so the resin flows directly onto and perpendicular to the back surface of the formed substrate through a gate means, said resin being constituted so as to polymerize in situ and fuse with said back surface of said substrate, said printing step (2) using inks that can withstand the stresses of the forming step (4) as well as the polymerization reaction temperatures of step (8) without deforming, wherein step (4) is performed by a cold forming process, wherein step (6) of preparing the formed substrate is performed by die-cutting the formed substrate in a manner such that said formed substrate is dimensioned to be placed into the mold with a minimal interference fit, wherein said flat substrate of step (1) is a clear polycarbonate and said two injected resin solutions of step (7) are made of dicyclopentadiene resin solutions, and wherein said mold surface is maintained at a temperature of 20°–80° C. and the resin solution temperature is maintained between 30° C. and 35° C. immediately prior to injection into said mold cavity.

29. The method according to claim 28 wherein said gate means include a plurality of gates, each gate supplies flowable resin in the range from a first selected area to a maximum area of the mold cavity of a second selected area so as to reduce internal stress in the applique product produced.

30. The method according to claim 28 wherein step (3) of cutting the substrate for forming is performed by punching the printed substrate to establish registration holes for forming by die-cutting with a steel rule die.

* * * * *